Aug. 26, 1952     D. L. HERR     2,608,682
ELECTROMAGNETIC RESOLVER
Filed Nov. 15, 1949     7 Sheets-Sheet 1

Fig. 1.

INVENTOR.
DONALD L HERR
BY
Burgess, Ryan & Hicks
ATTORNEYS

Aug. 26, 1952 D. L. HERR 2,608,682
ELECTROMAGNETIC RESOLVER
Filed Nov. 15, 1949 7 Sheets-Sheet 3

INVENTOR.
DONALD L. HERR
BY
Burgess, Ryan & Hicks
ATTORNEYS

Aug. 26, 1952     D. L. HERR     2,608,682
ELECTROMAGNETIC RESOLVER Filed Nov. 15, 1949     7 Sheets—Sheet 4

INVENTOR.
DONALD L. HERR
BY
Burgess Ryan & Hicks
ATTORNEYS

Aug. 26, 1952     D. L. HERR     2,608,682
ELECTROMAGNETIC RESOLVER Filed Nov. 15, 1949     7 Sheets-Sheet 5

INVENTOR.
DONALD L. HERR
BY
Burgess, Ryan & Hicks
ATTORNEYS

Aug. 26, 1952     D. L. HERR     2,608,682
ELECTROMAGNETIC RESOLVER
Filed Nov. 15, 1949     7 Sheets-Sheet 7

ROTOR BAR-and-CONDUCTOR ARRAYS $$\frac{E_r(\gamma)}{E_s} = \frac{j16\omega p_r \lambda}{Z_s \delta} N_{os} N_{or} \sum_n \underbrace{\left[\frac{(-1)^{\frac{n-1}{2}}}{2\pi n^2} \frac{q \sin Kn\pi/q}{K}\right]}_{X} \underbrace{\sum_r d_r \sin m(r) n\pi/q}_{Y}$$

and

STATOR BAR-and-CONDUCTOR ARRAYS $$\cdot \left[\frac{\sin n\pi/p}{n\Sigma|c_s|}\left(\Delta_n + \sum_s a_s \sin h(s) n\pi/p\right)\right] \cos n\gamma$$

$E_r(\gamma)$ = RMS Rotor Output Voltage
$\gamma$ = Angle of Rotor Rotation with Respect to Stator
$E_s$ = RMS Stator Input Voltage
$Z_s$ = Stator Complex Impedance at $\omega$
$\omega$ = Angular Frequency of Applied Stator Voltage
$\mu$ = Permeability (Effective) of Stator-Rotor Magnetic Material
$p_r$ = Radius (Effective) of Rotor
$\lambda$ = Length (Effective) of Rotor and Stator
$\delta$ = Air-Gap Width
$N_{os}$ = Total Number (Actual) Slot Conductors, Stator Winding
$N_{or}$ = Total Number (Actual) Slot Conductors, Rotor Winding $n$ = Order of Space Harmonic in $\gamma$
$q$ = Total Number of Uniform Rotor Bars
$K$ = Per Unit Skewness of Rotor Bar
$b_r$ = Relative Conductor Density in r'th Rotor Slot
$m(r)$ = Function of r (See Table Below)
$d_r = \frac{b_r}{\Sigma b_r}$ = Per Unit Conductor Density in r'th Rotor Slot
$l_r$ = Per Unit Slot Loading (Double Winding), Rotor
$p$ = Total Number of Uniform Stator Bars
$c_s$ = $a_s - a_{s-1}$ = Per Unit Conductor Density in s'th Stator Slot
$h(s)$ = Function of s (See Table Below)
$\Delta_n$ = Constant or Zero (See Table Below)
$l_s$ = Per Unit Slot Loading (Double Winding), Stator

| ROTOR | | BASIC TYPE | | STATOR | | |
|---|---|---|---|---|---|---|
| $m(r)$ | Limits of r | CODE | BAR ARRAY 90°   0° | $h(s)$ | Limits of s | $\Delta_n$ |
| $2r$ | $1 \to \frac{q-2}{4}$ | A | —┼— | $2s$ | $1 \to \frac{p-2}{4}$ | 0 |
| $2r-1$ | $1 \to \frac{q+2}{4}$ | B | ┼— | $2s-1$ | $1 \to \frac{p-2}{4}$ | $\sin\left(\frac{p-1}{2}\right)\frac{n\pi}{p}$ |
| $2r-1$ | $1 \to \frac{q}{4}$ | C | —┼ | $2s$ | $1 \to \frac{p-4}{4}$ | $\sin\left(\frac{p-1}{2}\right)\frac{n\pi}{p}$ |
| $2r$ | $1 \to \frac{q}{4}$ | D | —┼— | $2s-1$ | $1 \to \frac{p}{4}$ | 0 |

Fig. 12.

INVENTOR.
DONALD L. HERR
BY Burgess, Ryan & Hicks
ATTORNEYS

Patented Aug. 26, 1952

2,608,682

UNITED STATES PATENT OFFICE 2,608,682

ELECTROMAGNETIC RESOLVER

Donald L. Herr, New York, N. Y., assignor to Reeves Instrument Corporation, New York, N. Y., a corporation of New York Application November 15, 1949, Serial No. 127,438

22 Claims. (Cl. 336—120)

The present invention relates to improvements in electromagnetic devices and relates in particular to an alternating current, electromagnetic resolver.

An object of the present invention is to provide an electromagnetic resolver which will have high precision and accuracy at a plurality of useful carrier frequencies such as 60, 400 and 1,000 cycles per second. Another object of the invention is to provide a resolver that may be manufactured in quantity with the assurance that the desired standard of precision and accuracy will be present in each instrument. By achieving such objectives, the present invention materially reduces the cost of such instruments and also provides a resolver of greater precision and accuracy than those heretofore available.

Generally speaking, electromagnetic resolvers that are known to the art and available commercially are not so universal in their carrier frequency application and because of various shortcomings in their construction they are expensive instruments to manufacture. One reason for this is that in the manufacture of such resolvers, it is necessary to match the windings by hand in order to obtain high precision and accuracy. However, even the matching of windings by hand does not make it possible to obtain high precision and accuracy in all resolvers and a large percentage of such resolvers are not suitable for uses where high standards must be met.

In accordance with the present invention an electromagnetic resolver is provided that has the folowing features:

(a) Magnetic, mechanical, and electrical equivalence of both stator windings, and the same kind of equivalence of both rotor windings.

(b) The ability to develop the maximum ratio of reactance to resistance in each stator winding consistent with the dimensions, magnetic material and air gap employed.

(c) Identical space harmonic content, time harmonic content, and identical phase angles (time and space) as well as identical space harmonic generation, rejection and suppression patterns, for both stator windings.

(d) Identical space harmonic induction, rejection and suppression patterns, for both rotor windings.

(e) Slot and conductor distributions for the stator and rotor enabling a desired space harmonic pattern and resolver accuracy to be achieved.

(f) The establishing of optimum dimensions of stator, rotor, and air gap for which, if suitable magnetic material is used, the resolver behaves as if the total reluctance of any flux path, is essentially only that of the air gap.

(g) Minimum stator and rotor zero-spacing error.

(h) Minimum stator and rotor space inter-axis error.

(i) Minimum quadrature time-axis component.

Further objects and advantages of the invention will be apparent and best understood from the following description and the accompanying drawings in which:

Fig. 12 is an equation for determining the distribution of conductors in the stator and rotor of a resolver embodying the invention with an explanation of the symbols used therein.

In general, an alternating current electromagnetic resolver has a stator and a rotor which have salient poles with an appropriate degree of skewing and discretely distributed windings $S_1$ and $S_2$ on the stator and windings $R_1$ and $R_2$ on the rotor. The stator windings $S_1$ and $S_2$ are matched and are mechanically 90 degrees apart. The rotor windings $R_1$ and $R_2$ are also matched and are mechanically 90 degrees apart. Functions which such an alternating current electromagnetic resolver may perform are illustrated in Figs. 10 and 11.

Figure 10:
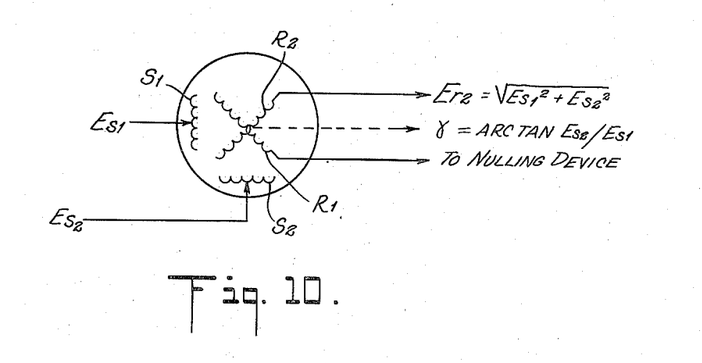
Fig. 10 is a schematic diagram illustrating one function of a resolver.
Figure 11:
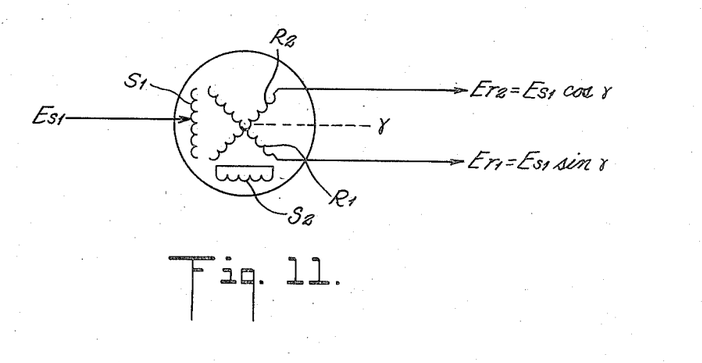
Fig. 11 is a schematic diagram illustrating another typical function of a resolver.

When, as illustrated in Fig. 10, A. C. voltages proportional to $E_{s1}$ and $E_{s2}$ are applied as inputs to the stator windings $S_1$ and $S_2$ respectively, the resolver rotor will be rotated to and indicate an angle of rotation $a = \tan^{-1} E_{s2}/E_{s1}$ by connecting the rotor winding $R_1$ to a nulling device and a voltage proportional to $$E_{r2} = \sqrt{E_{s1}^2 + E_{s2}^2}$$

will be obtained as the output of the rotor winding $R_2$. As illustrated in Fig. 11 when a voltage proportional to $E_{s1}$ is applied as the resolver input to the stator winding $S_1$ and the rotor is rotated to an angle $\alpha$, voltages proportional to $$E_{r2} = E_{s1} \cos \alpha$$

and $E_{r1} = E_{s2} \sin \alpha$ are obtained as outputs from the rotor windings $R_1$ and $R_2$, respectively.

Figure 3:
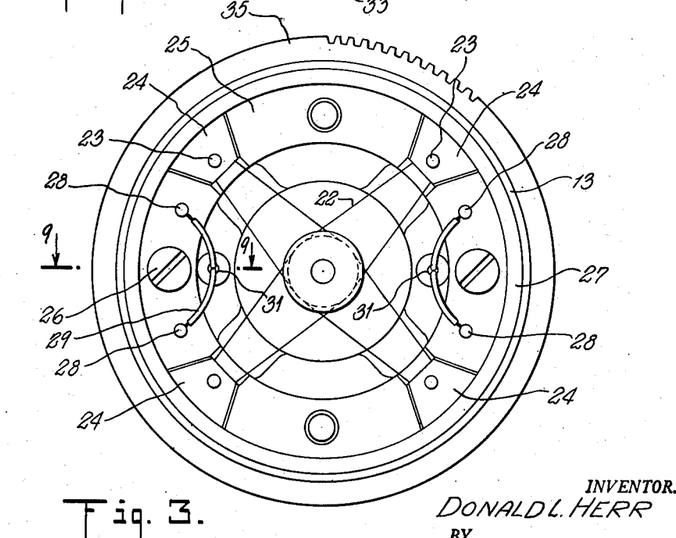
Fig. 3 is an end view of the resolver illustrated in Fig. 1 with the cover removed.

The two distributed stator windings $S_1$ and $S_2$ occupy the same magnetic structure in the stator with their axes of electrical symmetry mechanically 90 degrees apart. Each of the stator windings $S_1$ and $S_2$ develops an A. C. flux-density distribution in the stator-rotor airgap ($\delta$ in Fig. 3) which is ideally sinusoidal or cosinusoidal in the angle of position on the stator periphery, fundamental in the space-period of the air-gap circumference and proportional to the A. C. voltage applied to the stator winding.

Likewise in the rotor, the two distributed windings $R_1$ and $R_2$ occupy the same magnetic structure in the rotor with their axes of electrical symmetry mechanically 90 degrees apart. Each of the rotor windings $R_1$ and $R_2$, has induced in it, by the time rate of change of the flux-density distribution developed in the air-gap by the stator windings, a net A. C. voltage which is ideally sinusoidal or co-sinusoidal in the angle of rotor rotation with respect to the stator, fundamental in the space-period of the air-gap circumference and proportional to the A. C. voltage applied to either stator winding.

Such an instrument may be used for solving trigonometric and analytical problems such as the rotation of coordinates, the transformation of polar coordinates to rectangular coordinates, and vice-versa, and the resolution and addition of vectors. Such an instrument may also be used for high precision data transmission as it may be more accurate than a synchro and may eliminate the necessity for double sets of transmitters and receivers.

Figure 1:
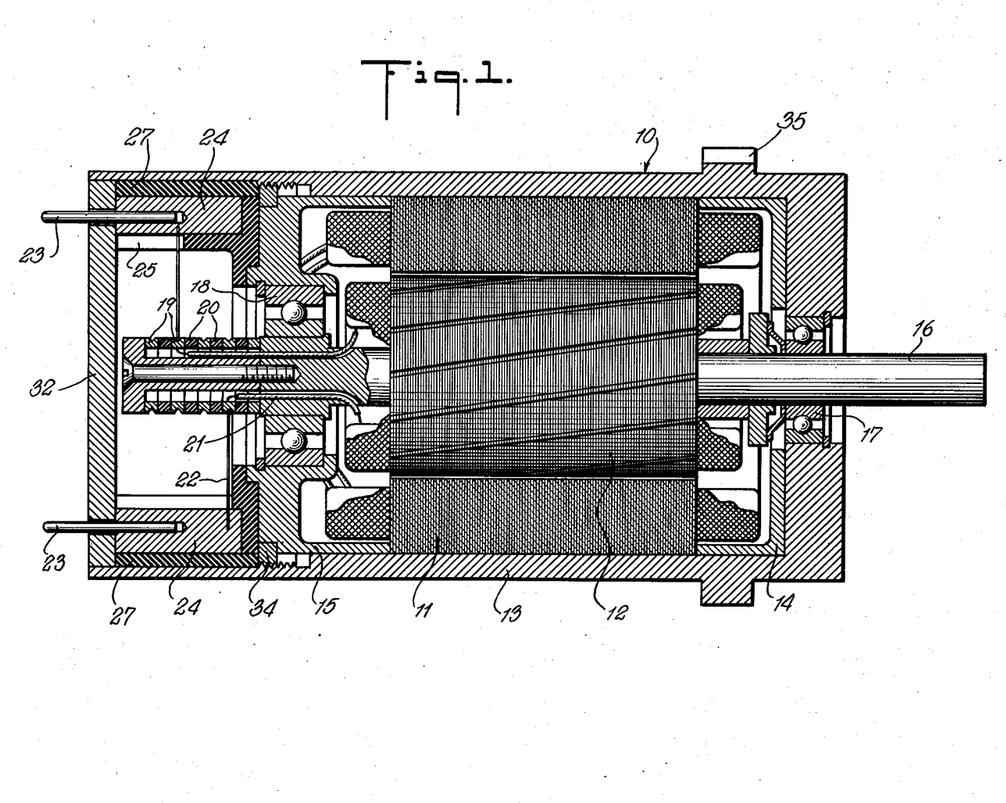
Fig. 1 is a side view in section of a resolver embodying the present invention.
Figure 2:
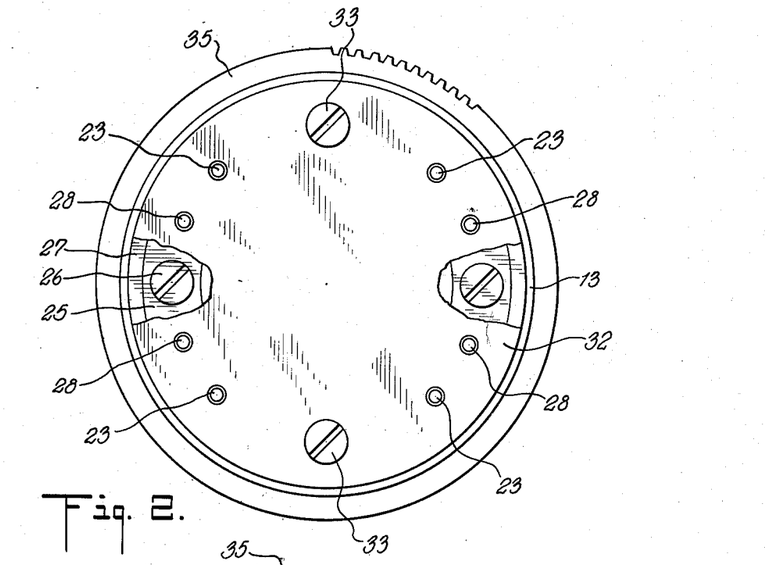
Fig. 2 is an end view of the resolver illustrated in Fig. 1.

Referring to Fig. 1, there is a resolver 10. The resolver 10 has a stator 11 and a rotor 12 both of which are made of laminated magnetic material. Such magnetic material is preferably of the high permeability low core-loss type as, for example, those materials whose composition is 47% to 50% nickel and approximately 50% pure iron, appropriately hydrogen annealed. A secondary material is electrical silicon steel commonly known as "transformer C" grade. The rotor and stator laminations should be .014 of an inch or less in thickness. By making the laminations of such thickness a sufficiently great ratio of stored magnetic energy per unit volume to dissipative energy per unit volume of the magnetic structure is obtained that permits the resolver to function with the desired degree of accuracy over a wide range of carrier frequencies.

The stator 11 is located inside of a tubular or cylindrical housing 13. One end of the housing is open to receive the stator and the stator is positioned within the housing by a magnetic shield 14 and an end bell 15 that also serves as a magnetic shield and a bearing support. The housing 13 and the end bell 15 are also made of metal or other material that will serve as a magnetic shield for the stator and rotor. The rotor 12 is rotatably supported inside of the stator 13 on a shaft 16.

The rotor shaft 16 extends through the closed end of the housing 13 and is journalled in a bearing 17 carried by the housing. The other end of the shaft 16 extends through the end bell 15 and journalled in a bearing 18 carried by the end bell. This end of the rotor shaft 16 carries a series of contact rings 19 that are insulated from each other by spacers 20. The windings $R_1$ and $R_2$ of the rotor are connected to the contact rings 19 by conductors 21 that run through the shaft 16. A spring brush 22 engages with each of the contact rings 19 and connects them to fixed contact pins 23 that are supported in conductor bars 24.

Figure 9:
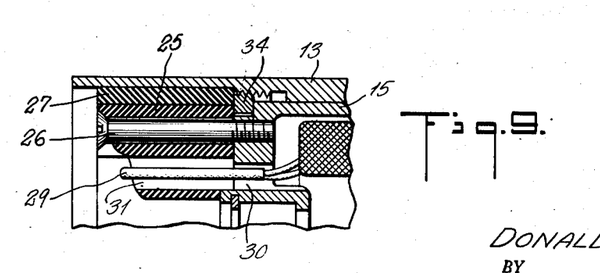
Fig. 9 is a fragmentary view in section taken along the line 9—9 of Fig. 3.

The conductor bars 24 are wedge-shaped and are removably supported in spaced relation to each other in a brush mounting ring 25 of insulating material that is secured to the end bell 15 by screws 26. The conductor bars 24 are held in place in the brush-mounting ring 25 by a sleeve or collar 27 of insulating material that fits over the ring 25. As shown best in Fig. 9, the stator windings $S_1$ and $S_2$ are connected to contact pins 28 by conductors 29 that pass through aligned openings 30 and 31 in the end bell and the ring 25, respectively. The contact pins 28 are also supported by the ring 25.

The contact pins 23 for the rotor windings $R_1$ and $R_2$ and the contact pins 28 for the stator windings $S_1$ and $S_2$ extend through a cover disc 32 of insulating material that encloses the open end of the housing 13. The cover disc 32 is secured to the end bell 15 by screws 33 and it, in turn, secures the sleeve 27 and the conductor bars 24 against lengthwise movement relative to the brush-mounting ring 25. This assembly consisting of the end bell 15, the contact pins 23 and 28 and the brushes 22 is secured in position within the open end of the housing 13 by a spanner nut 34 that engages with threads on the inside of the housing 13. The spanner nut 34 is rotatably carried between the brush-mounting ring 25 and the end bell 15 and may be threaded in place prior to the installation of the sleeve 27 and the cover disc 32.

Appropriate connections may be made to the end of the shaft 16 that extends beyond the housing 13 so that the rotor may be turned in angular relation to the stator as desired. The housing 13 also carries an annular gear sector 35 on its outer surface. The gear sector 35 extends for approximately 40° around the upper right hand quadrant of the housing and provides means for rotating the housing and the stator for zeroing the resolver when the rotor is held stationary.

Figure 4:
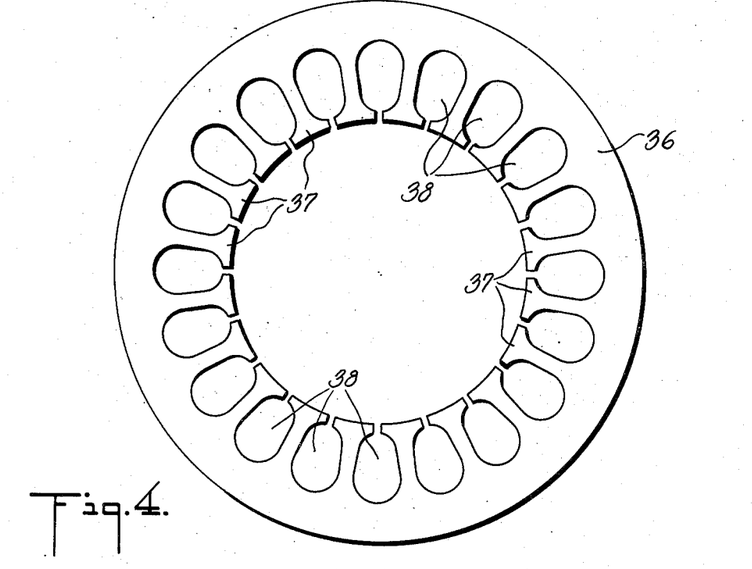
Fig. 4 is a plan view of a stator lamination for a resolver such as is illustrated in Fig. 1.

As shown best in Fig. 4, each of the stator laminations 36, of the illustrated embodiment, has twenty bars 37 and a like number of conductor slots 38 in which the conductors $c_s$ of the stator windings $S_1$ and $S_2$ are placed. As shown best in Fig. 5, each of the rotor laminations 39, of the illustrated embodiment, has twelve bars 40 and a like number of conductor slots 41 in which the conductors $d_r$ of the rotor windings $R_1$ and $R_2$ are placed In order to obtain identical distribution of the stator windings $S_1$ and $S_2$ and of the rotor windings $R_1$ and $R_2$ in the conductor slots 38 and 41 of the stator 11 and the rotor 12, respectively, with the axes of electrical symmetry of said windings being mechanically 90 degrees apart, the number of bars and conductor slots in the stator 11 and the rotor 12 are integral multiples of four. In addition, the number of bars for the stator 11 should preferably be four or more greater than the number of bars for the rotor 12 with a minimum number of twelve bars for the stator 11 and a minimum number of eight bars for the rotor 12.

Figure 5:
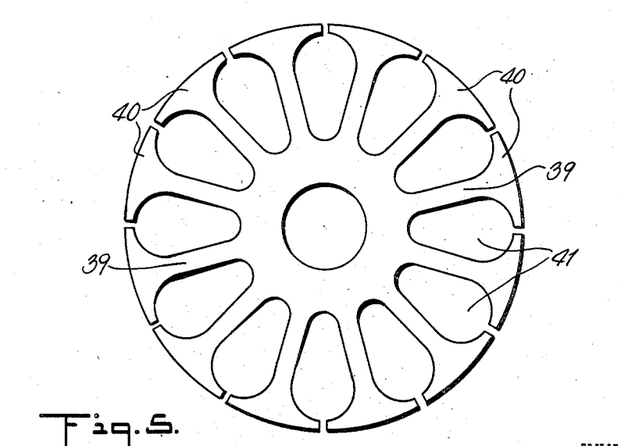
Fig. 5 is a plan view of a rotor lamination for a resolver such as is illustrated in Fig. 1.

It is desirable that the laminations 36 and 39 for the stator 11 and the rotor 12, respectively, be processed in a manner that will insure their having uniform magnetic properties. The details of such processing are well-known and need not be described here. In assembling the laminations 36 and 39 to form the stator and rotor, the respective sets of laminations are stacked and cemented together with suitable adhesives with the successive individual laminations being insulated from each other and progressively offset angularly with respect to each other to minimize any residual effects of possible magnetic orientation in the material itself. The stacked laminations forming the stator and rotor preferably are approximately one and one half (1½) inches in length and the rotor preferably is approximately one inch in diameter.

After the laminations are stacked and cemented together, they are then baked to bond the adhesive and after baking, the inner and outer major surfaces of the stator 11 and the outer surface of the rotor 12 may be ground to a final common concentricity, smoothness and appropriate diameters. Such grinding also renders the surfaces of the stator 11 and the rotor 12 more stable magnetically than otherwise so that accidental striking or jarring of these surfaces will not distort the magnetic pattern produced. The air gap $\delta$ between the stator and rotor should preferably be not greater than .00625 of an inch.

Also, in stacking the rotor laminations 39, they are skewed so that the bars 24 follow a helical path with a pitch equal to the distance of one pole in the length of the rotor. This is designated as a per unit skewness K of unity. For purposes of simplicity of discussion, all skewness will be assumed to be wholly in the rotor. However, it will be understood that the skewness may be partially or entirely in the stator 11 so long as the total skewness results in a degree of skewness that is equivalent to a skewness of unity in the rotor.

The purpose of skewing the bars of either the rotor or stator or both in this manner is to reduce the amplitude of those unwanted space harmonics which are both generated by the stator windings and are capable of being induced in the rotor windings. For example, an unskewed twenty bar stator and an unskewed twelve bar rotor are a combination that will completely suppress all space harmonics beginning with the 3rd to, but not including, the 59th and 61st (all even order harmonics being absent in the arrangements covered by the invention). The introduction of a per unit skewness of unity will result in the reduction (suppression or partial rejection) of both the 59th and 61st space harmonics to a minimum value of $1/n^3$ with respect to the amplitude of the fundamental space harmonics where "$n$" is the order of the harmonics (the 59th and 61st, respectively).

Also, while in the illustrated embodiment of the invention, the rotor 12 is described and shown as the rotatable member, it will be understood that in any application or use, either the stator 11 or the rotor 12 may be the rotatable member and the other fixed member.

Figure 8:
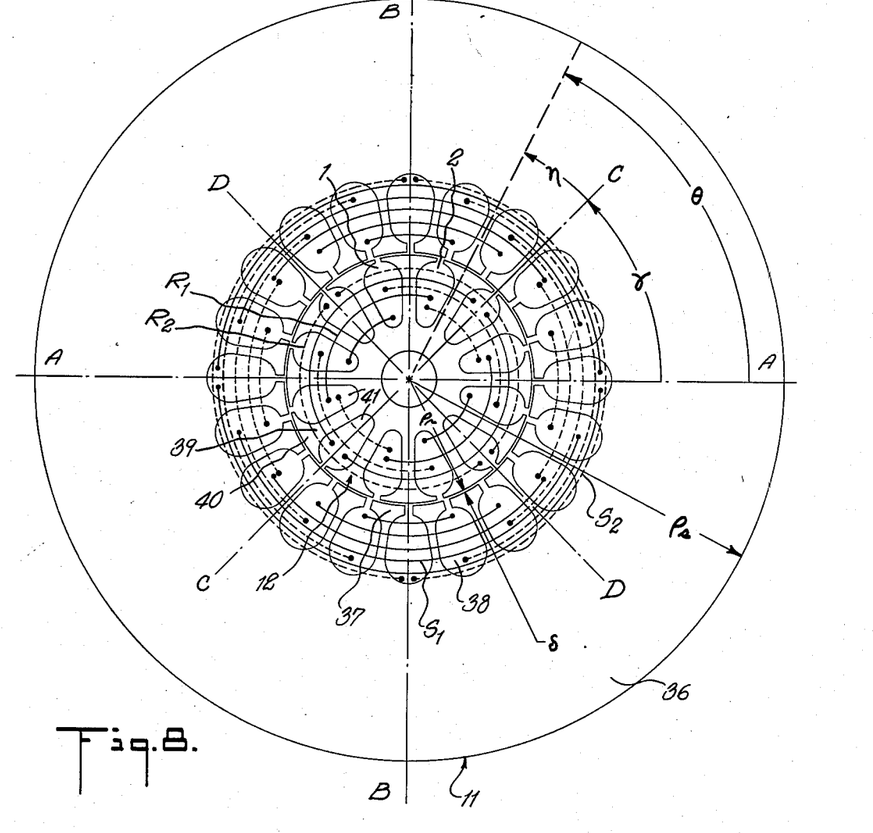
Fig. 8 illustrates schematically an arrangement for connecting the conductors for the stator and rotor windings of a resolver such as illustrated in Fig. 1.

Also, in order to obtain the optimum accuracy and precision, the effective magnetic diameters of the stator 11 and the rotor 12 should be in the proportion of 3 to 1. For example, as illustrated in Fig. 8, the effective magnetic diameter of the rotor 12 approaches one-third the effective magnetic diameter of the stator 11.

Figure 6:
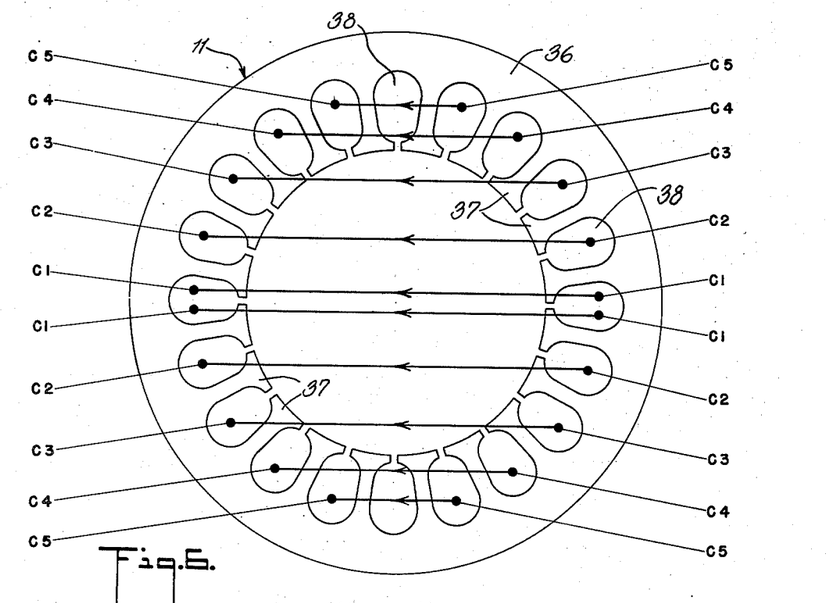
Fig. 6 illustrates schematically the conductor distribution and connections of one winding for the stator of a resolver embodying the invention.
Figure 7:
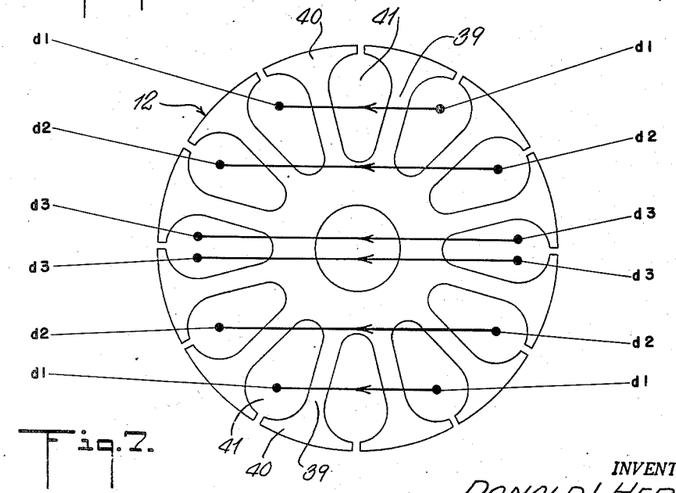
Fig. 7 illustrates schematically the conductor distribution and connections of one winding for the rotor of a resolver embodying the invention.

The manner in which the conductors $c_s$ and $d_r$ of one of the stator windings $S_1$ (or $S_2$) and the conductors of one of the rotor windings $R_1$ (or $R_2$) are distributed in the conductor slots 38 and 41 of the stator and rotor, respectively, to obtain symmetrical distribution is schematically illustrated in Figs. 6 and 7 with the conductors for the stator and rotor windings being identified by the reference character $c_1$-$c_5$ and $d_1$-$d_3$, respectively. The direction in which current flows in the conductors $c_1$-$c_5$ of the stator winding and in the conductors $d_1$-$d_3$ of the rotor winding is indicated by the arrows in Figs. 6 and 7, respectively, and this illustrates one way in which these windings may be connected to obtain the desired electrical characteristics.

The second winding on the stator and rotor, respectively, is similarly distributed and connected except that the electrical axes of these windings are displaced mechanically by 90 degrees from the windings illustrated in Figs. 6 and 7. In Fig. 8, connection of the conductors of the stator windings $S_1$ and $S_2$ and of the rotor windings $R_1$ and $R_2$ are shown schematically with the connections for the conductors of the stator winding $S_1$ and the rotor winding $R_1$ being represented by full lines and the connections for the stator winding $S_2$ and the rotor winding $R_2$ being represented by the broken lines. As will be seen from Fig. 8 the stator windings $S_1$ and $S_2$ are identical to each other and their axes of electrical symmetry are mechanically 90 degrees apart. The rotor windings $R_1$ and $R_2$ are also identical to each other and their axes of electrical symmetry are mechanically 90 degrees apart. In this figure, the axes of electrical symmetry are indicated by the line A—A for the stator winding $S_1$; by the line B—B for the stator winding $S_2$; the line C—C for the rotor winding $R_1$; and by the line D—D for the rotor winding $R_2$. The symbol $\rho_s$ indicates the stator diameter; the symbol $\rho_r$ indicates the rotor diameter; the symbol $\alpha$ indicates the angle through which the rotor has been rotated with respect to the stator; the symbol $\eta$ indicates a position in the rotor periphery with respect to the reference rotor coordinate and the symbol $\theta$ indicates a corresponding position in the stator periphery with respect to the reference stator coordinate.

Each of the stator windings $S_1$ and $S_2$ is designed to develop an A. C. flux-density distribution in the stator-rotor air-gap $\delta$ which is (ideally) sinusoidal or co-sinusoidal in the angle of position on the stator periphery, fundamental in the space-period of the air-gap circumference and proportional to the A. C. voltage applied to the stator winding. The conductor distribution of the windings is so chosen as to minimize or totally reject all higher order of space harmonics in the flux-density distribution in the air-gap.

Each of the rotor windings $R_1$ and $R_2$ is designed to have induced in it a net A. C. voltage which is (ideally) sinusoidal or co-sinusoidal in the angle of rotation of the rotor with respect to the stator, fundamental in the space-period of the air-gap circumference and proportional to the A. C. voltage applied to either stator winding and to minimize or totally reject all higher order of space harmonics in the rotor winding output voltage.

The equation set forth in Fig. 12 represents the stator to rotor transfer-function of an idealized resolver. The essential assumptions upon which this equation is based are an ideal metallic material having infinite magnetic permeability and zero core-loss, zero resistance for the conductors of the windings and zero rotor currents. This equation provides a basis for the determination of the optimum conductor distribution in both windings $S_1$ and $S_2$ and rotor windings $R_1$ and $R_2$. The definitions of all elements of this equation appear immediately beneath it. The variable "$r$," pertaining to the rotor, is the successive integral numbering of the rotor slots in one quadrant of the rotor structure when the rotor slots containing the rotor winding beginning with the conductor occupied slot of the rotor located closest to the pole of the rotor, are numbered in integral steps beginning with "one." The upper limit of "$r$" is as designated in the equation for each basic type of winding.

In a similar manner, for the stator, the variable "$s$" pertains to the numbering of the stator slots beginning with "one" for the conductor occupied stator slot closest to the equator of the stator winding and increasing integrally over one quadrant toward the pole of the stator winding. The limits of "$s$" pertaining to the stator conductor distribution are as shown also in the equation.

Since four, and only four, basic types of windings exist to perform the functions of an electromagnetic resolver covered by the invention, these basic types of windings are designated respectively as A, B, C, and D in reference to the equation. In types A and B, the number of bars is equal to an integral multiple of 4 plus 2 and in types C and D, the number of bars is equal to an integral multiple of 4. Windings of the types A, B, and C are inferior to the type D winding (illustrated in Figs. 6 and 7) because they produce intrinsically inferior space-harmonic rejection patterns or because of the difficulties of obtaining matched windings or both. Under the heading "bar array," under the heading "basic type," the heavy horizontal lines indicate symbolically the location of bar structures, as distinct from slot openings, with respect to the zero degree and ninety degree mechanical axes of the stator or rotor. The pattern is repeated for the one hundred and eighty degree and two hundred and seventy degree mechanical axes, respectively, of the stator or rotor.

The equation for the idealized stator-rotor transfer-function shows the idealized rotor output voltage $E_r$ referred to the stator input voltage $E_s$ as a function of $a$, the angle of rotor rotation with respect to stator, zero angle corresponding to the angle at which the rotor output voltage is a positive maximum. It consists of a constant factor times an infinite summation of odd order space harmonics beginning with the first order or fundamental space harmonic which is the only one desired in connection with the performance of the resolver function. All even-order space-harmonics are ideally zero. Each space harmonic of the order "$n$" varies as the cosine of $na$. Each such odd order space harmonic has an amplitude co-efficient equal to the product of the two constant factors in the brackets, with the value of "$n$" substituted therein for the space harmonic under consideration. When either of these bracketed factors is zero or when both are zero, for a particular "$n$" (odd order of space harmonic under consideration) the amplitude of that space harmonic will be zero and will not appear in the rotor output.

With regard to the rotor, for any particular value of "$n$," that is, for any particular odd order space harmonic under consideration, if the summation denoted by X or the factor Y is zero that space harmonic will not appear in the rotor output. Likewise, with regard to the stator, if the summation denoted by W or the factor V is zero, for any particular value of "$n$," that order of space harmonic will not appear in the rotor output. The factor V will be zero for all space harmonics whose order is an integral multiple of the number of bars on the stator structure. Since the basic equation has been formulated on the complete elimination of all even order space harmonics the factor V does not perform any useful function. The factor W pertains to the distribution of the conductors of the stator winding in the stator slots and can be made to be zero for any odd order integral value of "$n$." By obtaining an appropriate set of $a_s$ values, a corresponding number of such odd order space harmonics may be eliminated by the one winding. The values of $a_s$ for any given stator pole structure are therefore obtained as the solutions of a system of simultaneous algebraic equations.

Likewise for the factor X pertaining to that conductor distribution in the rotor winding is selected which will eliminate the maximum number of unwanted space harmonics.

The factor Y, pertaining to the per unit skewness of the rotor structure makes possible the suppression of the remaining space harmonics which are generated in the air-gap by the stator winding and which are not rejected completely by the conductor distribution of the rotor winding. As previously explained, these space harmonics are suppressed by unity per-unit skewness.

The equation may be used to determine the stator space harmonic suppression patterns obtainable with a number of basic stator types. Similarly, the equation may be used to determine the rotor space harmonic suppression patterns possible for a number of basic rotor types. As a specific example, the conductor distribution and space-harmonic content for a 20 bar stator having a basic type D winding is given in the following tabulation:

*20 bar stator, Type D*

| Slot (s) | Per Unit Conductor Density ($c_s$) |
| --- | --- |
| 1 | .15838 |
| 2 | .30127 |
| 3 | .25628 |
| 4 | .18618 |
| 5 | .09789 |

*Harmonic content*

| Harmonic Order | Relative Amplitude |
| --- | --- |
| $n$ | $S_n$ |
| 1 | .39595 |
| 3 | 0 |
| 5 | 0 |
| 7 | 0 |
| 9 | 0 |
| 11 | 0 |
| 13 | 0 |
| 15 | 0 |
| 17 | 0 |
| 19 | .020840 |
| 21 | .018855 |

In the above tabulations the heading "$c_s$" gives the per unit slot conductor distribution which will result in the stated relative space harmonic suppression pattern. Thus, a stator winding containing 1000 turns (2000 slot conductors) would result in the following turn distribution in each half of the stator winding beginning with the equatorial coil.

*20 bar type D stator semi-circular turn distribution beginning with equatorial coil*

| Slot No. | ($c_s \times 500$) |
| --- | --- |
| 1 | 79.190 |
| 2 | 150.635 |
| 3 | 128.140 |
| 4 | 93.090 |
| 5 | 48.945 |
| | 500.000 = $500 \Sigma c_s$ |

Since electrically and mechanically the "least-count" of a winding which may be wound is 0.50000 turn, the rounding off to full half-turns or full-whole turns in each coil of the winding is accomplished once and for all after an initial total winding to establish a particular maximum transformation ratio desired (unity or other) from stator input to rotor output for a particular magnetic material.

The following tabulations give the conductor distribution for a 12 bar rotor structure of the basic type D and the space-harmonic content of the various odd order harmonics (under "$R_n$") for four different values of per unit skewness, for the conductor distribution under the heading "$d_r$":

*12 bar rotor, Type D*

| Slot ($r$) | Per Unit Conductor Density ($d_r$) |
| --- | --- |
| 1 | .26795 |
| 2 | .46410 |
| 3 | .26795 |

The distribution of fractional terms is established in the same manner as that specified for the stator as described above.

*12 bar rotor, Type D, space-harmonic content, 4 different skewnesses*

| Harmonic Order, $n$ | Relative Amplitude ($R_n$) | | | |
| --- | --- | --- | --- | --- |
| | K=0 | K=12/13 | K=12/12 | K=12/11 |
| 1 | .40191 | .39805 | .39734 | .39645 |
| 3 | 0 | 0 | 0 | 0 |
| 5 | 0 | 0 | 0 | 0 |
| 7 | 0 | 0 | 0 | 0 |
| 9 | 0 | 0 | 0 | 0 |
| 11 | .036538 | .0063873 | .0032837 | 0 |
| 13 | .030916 | 0 | .0023511 | −.0045019 |
| 15 | 0 | 0 | 0 | 0 |
| 17 | 0 | 0 | 0 | 0 |
| 19 | 0 | 0 | 0 | 0 |
| 21 | 0 | 0 | 0 | 0 |

Thus, for a 1000 turn rotor winding, slot $d_1$ in the upper right quadrant of the rotor winding (the slot closest to the pole) will contain (.26795) ×500 conductors, and the number of conductors for slots $d_2$ and $d_3$ approaching towards the equator is similarly established.

Briefly summarizing, a resolver that maintains its accuracy and precision over a wide range of carrier frequencies, such as from 60 to 1000 cycles per second, is provided by observing the following factors:

1. Using a high permeability, low core-loss magnetic material, such as 47 to 50% nickel and 50% pure iron that has been hydrogen annealed, for the stator and rotor laminations;

2. Having the laminations for the stator and rotor not greater than .014 inches thick;

3. Having twenty bars and conductor slots on the stator and twelve bars and conductor slots on the rotor;

4. Having the per unit skewness of the stator and rotor bars equivalent to a per unit skewness of unity for the rotor bars;

5. Having an air-gap between the faces of the stator bars and the rotor bars not greater than .00625 inches;

6. Having the stator and rotor of approximately one and one-half inches in length and the rotor of approximately one inch in diameter; and 7. Having a pair of matched windings on the stator and a pair of matched windings on the rotor with the windings having identical conductor distribution in conductor slots that are spaced mechanically 90 degrees apart in the stator and rotor respectively.

8. Rotor output voltages driving high impedance receivers, such as the two meghohm-to-ground impedance of the vacuum tube grid input of an isolation amplifier.

A resolver may be constructed in accordance with the foregoing that will have a functional error that is equal to or less than plus or minus five hundredths of one percent (.05%) over 360° of rotation for any stator-rotor combination at carrier frequencies of 60, 400 or 1,000 cycles per second when used appropriately in a computing system.

It will be understood that various changes and modifications may be made in the embodiment of the invention illustrated and described herein without departing from the scope of the invention as defined by the claims appended hereto.

I claim:

1. In an electromagnetic instrument of the character described, the combination that includes a stator consisting of laminations of a high permeability, low core-loss magnetic material that are insulated from each other, said stator having a central opening and a series of bars uniformly spaced about the inner periphery of said opening with conductor slots located between the adjacent bars, the number of said bars in said series being a multiple of four, and a rotor consisting of laminations of a high permeability, low core-loss magnetic material that are insulated from each other, said rotor being rotatably mounted within the stator and having a series of bars spaced about its outer surface with conductor slots located between the adjacent bars, the number of rotor bars in said series being a multiple of four but not less than eight and at least four less than the number of stator bars, said bars in the stator and in the rotor having a per unit skewness equivalent to per unit skewness of unity for the rotor bars.

2. In an electromagnetic instrument of the character described, the combination as defined in claim 1 wherein there are twenty bars in the stator and twelve bars in the rotor.

3. In an electromagnetic instrument of the character described, the combination as defined in claim 1 wherein the major inner and outer surfaces of the stator and the major outer surfaces of the rotor are ground to final dimensions and a common concentricity;

4. In an electromagnetic instrument of the character described, the combination as defined in claim 1 wherein the ratio of the effective magnetic diameter of the stator to the effective magnetic diameter of the rotor is three to one.

5. In an alternating-current electromagnetic resolver, the combination including a stator consisting of laminations of a high-permeability low core-loss magnetic material, said laminations being insulated from each other with each of said laminations being of a thickness not greater than .014 of an inch and having a central opening therein, a series of bars spaced about the periphery of said opening with conductor slots located between the adjacent bars, the number of bars in said series being a multiple of four, a rotor consisting of laminations of a high-permeability low core-loss magnetic material rotatably mounted within the stator, said rotor having its outer surface spaced from the inner surface of the stator by a distance of not more than .00625 of an inch, said rotor laminations being insulated from each other with each of said laminations being of a thickness not greater than .014 of an inch and having a series of bars uniformly spaced about its outer periphery with conductor slots located between adjacent bars, the number of said bars in the rotor laminations being a multiple of four but not less than eight and at least four less than the number of bars in the stator laminations, the bars in the stator and the rotor having a per unit skewness equivalent to a per unit skewness of unity for the bars in the rotor.

6. In an alternating-current electromagnetic resolver, the combination as defined in claim 5 wherein the stator and the rotor are one and one-half inches in length and the rotor is one inch in diameter.

7. In an alternating-current electromagnetic resolver, the combination as defined in claim 5 wherein the laminations for the stator and the rotor are formed from a magnetic material consisting of from 47 to 50 per cent nickel and 50 per cent pure iron that has been hydrogen annealed.

8. In an alternating-current electromagnetic resolver, the combination as defined in claim 5 which includes a pair of matched windings on the stator, said stator windings each having an identical distribution of their conductors in the stator conductor slots but with their axes of electrical symmetry being spaced mechanically 90 degrees apart and a pair of matched windings on the rotor, said rotor windings each having an identical distribution of their conductors in the rotor conductor slots but with their axes of electrical symmetry being spaced mechanically 90 degrees apart.

9. In an alternating-current electromagnetic resolver, the combination that includes a stator and a rotor consisting of laminations of a magnetic material, said laminations in the stator and the rotor, respectively, being insulated from each other and consisting of from 47 to 50 per cent nickel and 50 per cent iron that has been hydrogen annealed, each of the stator laminations having a central opening therein with a series of bars spaced about said opening with conductor slots located between the adjacent bars, the number of poles in said series being a multiple of four, each of the rotor laminations having a series of bars spaced about its outer periphery with conductor slots located between adjacent bars, the number of said bars in the rotor laminations being a multiple of four but not less than eight and at least four less than the number of stator bars, said rotor being rotatably mounted inside of the stator with the faces of the rotor bars being spaced from the faces of the stator bars, a pair of matched windings on the stator, said stator windings each having an identical distribution of conductors in the conductor slots in the stator with their axes of electrical symmetry being spaced mechanically 90 degrees apart, and a pair of matched windings on the rotor, said rotor windings each having an identical distribution of conductors in the conductor slots of the stator with their axes of electrical symmetry being spaced 90 degrees apart.

10. In an alternating-current, electromagnetic resolver, the combination as defined in claim 9 wherein there are twenty bars in the stator and twelve bars in the rotor.

11. An alternating-current, electromagnetic resolver comprising a stator, a rotor rotatably mounted within the stator, said stator and rotor each being formed from laminations of a high permeability, low core-loss magnetic material and being not greater than .014 of an inch thick, said stator laminations having twenty bars spaced about their inner periphery with conductor slots located between the adjacent bars and said rotor laminations having twelve salient magnetic bars spaced about their outer periphery with conductor slots located between the adjacent bars, said stator and rotor bars having a per unit skewness equivalent to a per unit skewness of unity for the rotor bars, the bar faces of the stator bars being spaced from the bar faces of the rotor by a distance not greater than .00625 of an inch, a pair of matched windings on the stator each of said stator windings having an identical distribution of conductors in conductor slots in the stator that are spaced mechanically 90 degrees apart and a pair of matched windings on the rotor each of said rotor windings having an identical distribution of conductors in conductor slots in the rotor that are spaced 90 degrees apart.

12. An alternating-current electromagnetic resolver as defined in claim 11 wherein the stator and the rotor are not greater than one and one-half inches in length and the rotor is not greater than one inch in diameter.

13. An alternating-current, electromagnetic resolver as defined in claim 11 wherein the stator and rotor laminations are formed from a hydrogen annealed magnetic material consisting of 47 to 50 per cent nickel and 50 per cent pure iron.

14. An alternating-current, electromagnetic resolver as defined in claim 11 wherein the stator and rotor are not greater than one and one-half inches in length and the rotor is not more than one inch in diameter and the stator and rotor laminations are formed from a hydrogen annealed magnetic material consisting of from 47 to 50 per cent nickel and 50 per cent pure iron.

15. In an alternating-current electromagnetic resolver, the combination that includes a stator of laminated magnetic material of high permeability and low core-loss, said stator having a central opening and a series of bars uniformly spaced about its inner periphery with conductor slots located between the adjacent bars, the number of said bars in said series being a multiple of four, a pair of matched windings carried by the stator, said windings having an identical distribution of conductors in conductor slots of the stator that are spaced mechanically 90 degrees apart, a rotor of laminated magnetic material of high permeability and low core-loss rotatably mounted within the stator, said rotor having a series of bars uniformly spaced about its outer circumference with conductor slots located between the adjacent bars, the number of said bars in said series being a multiple of four, but not less than eight and at least four less than the number of stator bars, and a pair of matched windings carried by the rotor, said rotor windings having an identical distribution of conductors in conductor slots of the rotor that are spaced mechanically 90 degrees apart, and where a magnetomotive force distribution of the stator windings, a conductor slot distribution of the rotor windings, a per unit skewness of the stator and rotor bars are chosen to eliminate the maximum number of space-harmonics above the first in the formula $$\frac{E_r(\alpha)}{E_s} = \frac{j}{Z_s} \frac{16\omega p_r \lambda}{\delta} N_{os} N_{or}$$

$$\sum_n \left[ \frac{(-1)^{\frac{n-1}{2}}}{2\pi n^2} q \frac{\sin Kn\pi/q}{K} \sum_r d_r \sin m(r) n\pi/q \right].$$

$$\left[ \frac{\sin n\pi/p}{n\Sigma|c_s|} \left( \Delta_n + \sum_s a_s \sin h(s) n\pi/p \right) \right] \cdot \cos n\alpha$$

16. In an electromagnetic resolver, the combination which includes a cylindrical housing, a stator of laminated magnetic material carried with said housing, an end bell engaging with and supporting the stator in a fixed position within the housing, a centrally disposed rotatable shaft located inside of said stator, said shaft being supported at one end by the end bell and at the other end by the housing, a rotor of laminated magnetic material rotatably supported within the stator on said shaft, said stator and rotor each having a series of spaced bars on their opposing surfaces with conductor slots located between the adjacent bars, the number of said bars on the stator and rotor being a multiple of four but being not less than twelve and eight respectively with the number of stator bars being at least four greater than the number of rotor bars, a pair of matched windings carried by the stator and a pair of matched windings carried by the rotor, each winding of the respective pairs of said windings having its axis of electrical symmetry spaced mechanically 90 degrees from the axis of electrical symmetry of the other winding of said pair.

17. In an electromagnetic resolver, the combination as defined in claim 16 including contact rings carried by one end of the shaft supporting the rotor, said contact rings being insulated from each other and being respectively connected to the pair of matched rotor windings, a brush supporting ring of insulating material secured to the end bell and spring brushes carried by said brush supporting ring and contacting wtih said contact ring.

18. In an electromagnetic resolver, the combination as defined in claim 17 which includes a sector of an annular gear secured to and extending around a portion of the housing.

19. In an alternating-current electromagnetic resolver, the combination including a stator of laminated magnetic material, said stator having a central opening and a series of bars uniformly spaced about its inner periphery with conductor slots located between the adjacent bars, the number of stator bars in said series of bars being a multiple of four, a pair of matched windings on said stator, each of said windings having an identical conductor distribution in conductor slots of the stator that are spaced mechanically 90 degrees apart, a rotor of laminated magnetic material rotatably mounted within the stator, said rotor having a series of bars uniformly spaced about its outer circumference with conductor slots located between the adjacent bars, the number of rotor bars in said series being a multiple of four, but not less than eight and at least four less than the number of stator bars, a pair of matched windings on the rotor, each of said windings having an identical conductor distribution in conductor slots of the rotor that are spaced mechanically 90 degrees apart and the bars of the stator and rotor are skewed with a per unit skewness equivalent to per unit skewness of unity in the rotor bars.

20. In an alternating current electromagnetic resolver, the combination as defined in claim 19 wherein the conductors of each of the stator windings develop an alternating current flux-density distribution in the stator-rotor air-gap that is sinusoidal in the angle of position on the stator periphery, fundamental in the space-period of the air-gap circumference and proportional to the alternating current voltage applied to the stator winding and the conductors of each of the rotor windings having induced in them a net alternating current voltage that is sinusoidal in the angle of rotor rotation with respect to the stator, fundamental in the space-period of the air-gap circumference and proportional to the alternating current voltage applied to either stator winding.

21. In an electromagnetic instrument of the character described, the combination as defined in claim 1 which includes a pair of matched windings having conductors located in the conductor slots of the stator, said stator windings having their axes of electrical symmetry spaced apart mechanically by 90 degrees, a pair of matched windings having conductors located in the conductor slots of the rotor, said rotor windings having their axes of electrical symmetry spaced apart mechanically by 90 degrees, each of said stator and rotor windings having a conductor distribution which is identical in all four quadrants of the magnetic structure of the stator and rotor, respectively, with the conductors of each winding being located in all of said conductor slots except the conductor slots located at 90 and 270 degrees with respect to the zero axis of the respective winding and the distribution of the conductors of each winding among the conductor slots of each quadrant in which conductors of said winding are present is chosen to eliminate the maximum number of space-harmonics above the first.

22. In an electromagnetic instrument of the character described, the combination as defined in claim 1 which includes a pair of matched windings having conductors located in the conductor slots of the stator, said stator windings having their axes of electrical symmetry spaced apart mechanically by 90 degrees, a pair of matched windings having conductors located in the conductor slots of the rotor, said rotor windings having their axes of electrical symmetry spaced apart mechanically by 90 degrees, each of said stator and rotor windings having a conductor distribution which is identical in all four quadrants of the magnetic structure of the stator and rotor, respectively, with the conductors of each winding being located in all of said conductor slots except the conductor slots located at 90 and 270 degrees with respect to the zero axis of the respective winding and the distribution of conductors of each winding among the conductor slots of each quadrant in which conductors of said winding are present is chosen to eliminate the maximum number of space-harmonics above the first in the formula $$\frac{E_r(\alpha)}{E_s} = \frac{j}{Z_s} \frac{16\omega P_r \lambda}{\delta} N_{os} N_{or}$$

$$\sum_n \left[ \frac{(-1)^{\frac{n-1}{2}} q}{2\pi n^2} \frac{\sin Kn\pi/q}{K} \sum_r d_r \sin m(r) n\pi/q \right] \cdot$$

$$\left[ \frac{\sin n\pi/p}{n\Sigma|c_s|} \left( \Delta_n + \sum_s a_s \sin h(s) n\pi/p \right) \right] \cdot \cos n\alpha$$

DONALD L. HERR.

REFERENCES CITED

The following references are of record in the file of this patent:

UNITED STATES PATENTS

| Number | Name | Date |
|---|---|---|
| 1,672,703 | West | June 5, 1928 |
| 2,466,690 | Curry, Jr. | Apr. 12, 1949 |
| 2,488,771 | Glass | Nov. 22, 1949 |